United States Patent
Kostenick, Jr. et al.

(10) Patent No.: US 8,336,222 B1
(45) Date of Patent: Dec. 25, 2012

(54) METHOD AND APPARATUS FOR MEASURING SPACES WITH LIMITED ACCESS

(75) Inventors: Paul Gregory Kostenick, Jr., Marysville, WA (US); Darrell Darwin Jones, Mill Creek, WA (US); Tracy Edward Zimmerman, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/169,945

(22) Filed: Jun. 27, 2011

(51) Int. Cl.
*G01B 5/18* (2006.01)
*G01B 5/02* (2006.01)

(52) U.S. Cl. ............................................. 33/542; 33/836

(58) Field of Classification Search ................... 33/542, 33/542.1, 544.4, 700, 832, 836
See application file for complete search history.

(56) References Cited

U.S. PATENT DOCUMENTS

| | | | |
|---|---|---|---|
| 2,650,435 A * | 9/1953 | Kidd | 33/836 |
| 2,888,751 A * | 6/1959 | Pedrick | 33/544.4 |
| 2,910,781 A * | 11/1959 | Bishop | 33/542.1 |
| 3,706,307 A | 12/1972 | Hasson | |
| 4,033,043 A * | 7/1977 | Cunningham | 33/542 |
| 4,837,615 A | 6/1989 | Boshier | |
| 4,848,137 A | 7/1989 | Turner et al. | |
| 4,930,226 A * | 6/1990 | Shindelar | 33/832 |
| 7,216,441 B2 * | 5/2007 | Batora | 33/836 |
| 7,730,789 B2 | 6/2010 | Odendahl | |
| 2009/0235546 A1* | 9/2009 | Klepp | 33/542 |
| 2010/0137874 A1* | 6/2010 | Kim et al. | 33/836 |
| 2011/0125271 A1 | 5/2011 | Lambrecht et al. | |

FOREIGN PATENT DOCUMENTS

EP    2008585 A1    12/2008

OTHER PUBLICATIONS

European Search Report, dated Oct. 6, 2012, regarding Application No. 12171644.3-2213, 6 pages.

* cited by examiner

*Primary Examiner* — G. Bradley Bennett
(74) *Attorney, Agent, or Firm* — Yee & Associates, P.C.

(57) ABSTRACT

A method and apparatus for measuring a space between parts having restricted access is disclosed. An apparatus may comprise an elongate member, a flange, and a measurement system. An end of the elongate member is configured to move through a hole in a first structure into a space located between the first structure and a second structure. The flange extends from the elongate member. The elongate member is configured to expand after the flange exits the hole in the first structure such that the flange is unable to pass back through the hole. The measurement system is configured to measure movement of the end of the elongate member to identify a length of the space between the first structure and the second structure.

20 Claims, 10 Drawing Sheets

METHOD AND APPARATUS FOR MEASURING SPACES WITH LIMITED ACCESS

BACKGROUND INFORMATION

1. Field

The present disclosure relates generally to measuring and, more particularly, the present disclosure relates to methods and apparatuses for measuring a space between components. Still more particularly, the present disclosure relates to the measurement of the space between components, such as aircraft components, where the space is accessible by a hole in one of the components.

2. Background

Manufacturing structures, such as those for aircraft, involve the assembly of different parts to form the structures. A certain level of fit between parts is desired but not always possible. For example, during manufacture of an aircraft tail assembly, the skin of a horizontal stabilizer is attached to a spar of the aircraft frame. The skin and spar are examples of adjacent pieces that may have a space between them.

A shim may be placed in the space between adjacent parts. In certain cases, identifying the size of a space between the two adjacent parts with a desired level of precision may be needed to design a shim that provides as tight a fit in the space as desired.

The physical configuration of assembled parts can present difficulties for measuring the space between the parts. For example, an operator may have difficulties in accessing the space between the parts to make measurements of the space. In some cases, a partial disassembly of parts may be performed to access the space. In other cases, access may be limited to an opening that may be present in the parts or between the parts. With these situations, measurements may not be made with as great a level of precision as desired. As a result, if a shim made for the space does not fit as tightly as desired, the shim may be reworked or replaced until a desired fit is obtained.

As a result, the manufacturing of the aircraft may take more time and expense than desired to obtain a desired fit between parts. Accordingly, it would be advantageous to have a method and apparatus which takes into account one or more of the issues discussed above, as well as possibly other issues.

SUMMARY

The present disclosure provides a method and apparatus for measuring a space between parts. In one advantageous embodiment of the present disclosure, an apparatus is provided for measuring. The apparatus comprises an elongate member. An end of the elongate member is configured to move through a hole in a first structure into a space located between the first structure and a second structure. A flange extends from the elongate member, and the elongate member is configured to expand after the flange exits the hole in the first structure such that the flange is unable to pass back through the hole. A measurement system is configured to measure movement of the end elongate member in order to identify a length of the space between the first structure and the second structure.

In another advantageous embodiment, an apparatus for measuring a space includes a tube, a flange, a rod, and a measuring device. The tube includes a first end. The first end of the tube is configured to transition between a compressed position and an expanded position. The tube may also include at least one cutaway portion proximate to the first end. The flange and the first end may be configured to pass through a hole of a first part when the first end is in the compressed position. Further, the flange may be configured such that the upper surface of the flange contacts a lower surface of the first part when the first end is in the expanded position. The rod may be disposed so as to move in the tube. The rod may be configured to transition the tube to the expanded position when the rod is inserted in the tube proximate to the first end. The measuring device may be configured to record movement of the tube.

In still a further advantageous embodiment, a method is provided for measuring a space between a first part and a second part. The method includes steps of inserting a first end of a tube into a hole of the first part until a lower surface of a flange disposed on the tube contacts a first surface of the second part; making a measurement of distance between a first surface of the first part and the first surface of the second part as a first measurement; raising the tube until an upper surface of the flange disposed on the tube contacts a second surface of the first part; making a measurement of distance between the first surface of the first part and the second surface of the first part as a second measurement; and determining the space between the second surface of the first part and the first surface of the second part.

In yet another advantageous embodiment, a method is provided for measuring a space between a first part and a second part. A first end of a tube is inserted into a hole of the first part until the first end of the tube contacts a first surface of the second part. A measuring device is zeroed when the first end of the tube contacts the first surface of the second part. An upper surface of a flange disposed on the first end of the tube is placed against a second surface of the first part. A measurement is made of the distance between the first surface and the second surface of the first part.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
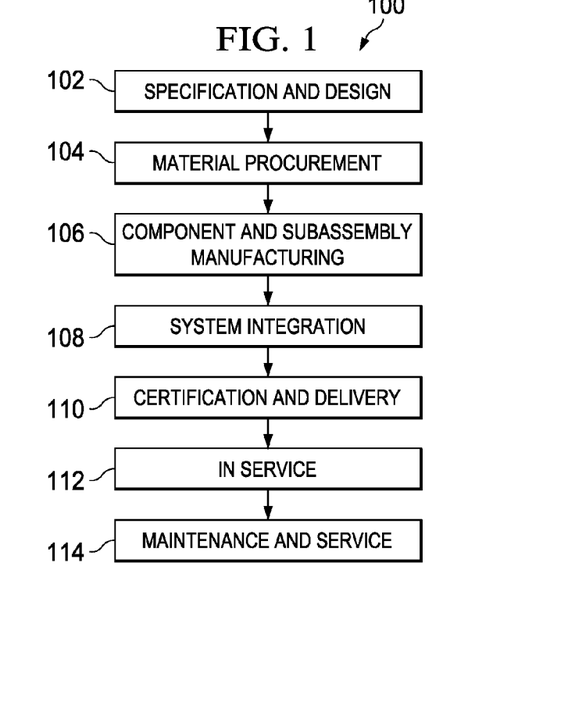
FIG. 1 is an illustration of a diagram illustrating an aircraft manufacturing and service method.
Figure 2:
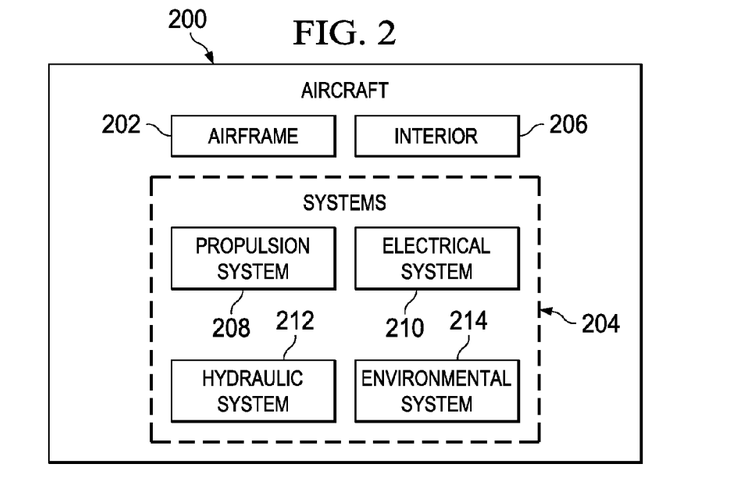
FIG. 2 is an illustration of a diagram of an aircraft in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments are one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

For example, one or more of the different advantageous embodiments may be used to make measurements of spaces between parts during, for example, without limitation, component and subassembly manufacturing 106 and system integration 108.

The different advantageous embodiments recognize and take into account a number of different considerations. For example, the different advantageous embodiments recognize and take into account that access to the space between two parts may be made through holes in the parts. For example, the space between parts may be accessible through a hole in one of the parts. The size of the hole may not allow an operator making measurements to insert a tool in the hole to make a measurement of the space between the pieces.

The different advantageous embodiments recognize and take into account that a manual feeler gauge is inadequate for measurements in these situations. This type of gauge has a configuration and/or size that prevents placing the gauge through the hole to make measurements of the space. The different advantageous embodiments recognize and take into account that enlarging holes or drilling new holes with a sufficient size for the gauge may be undesirable.

The different advantageous embodiments recognize and take into account that having a tool and a method of using the tool that could make space measurements in structures that have restricted access is desirable. The different advantageous embodiments recognize and take into account that having a tool and a method of using the tool that allows the operator to make measurements with a desired level of precision is desirable. The different advantageous embodiments recognize and take into account that having a method and apparatus that allows an operator to take multiple measurements of multiple locations more quickly and precisely as compared to current systems is desirable.

The different advantageous embodiments recognize and take into account that measurement of spaces between parts is difficult or impossible using known methods, particularly in structures offering restricted access. There may be insufficient room through which to position a measuring device, such as a feeler gauge. Additionally, the different advantageous embodiments recognize and take into account that cutting access passages or manholes in certain structures, such as aircraft assemblies, to allow physical access is undesirable. The different advantageous embodiments also recognize and take into account that measurement of multiple spaces at multiple locations using known methods is a cumbersome and time-consuming process.

Thus, the different advantageous embodiments provide a method and apparatus for measuring spaces between parts. An apparatus comprises an elongate member, a flange extending from the elongate member, and a measurement system. An end of the elongate member is configured to move through a hole in a first structure into a space located between the first structure and a second structure. The elongate member is configured to expand after the flange exits the hole in the space such that the flange is unable to pass back through the hole. The measurement system is configured to measure movement of the end elongate member to identify a length of the space between the first structure and the second structure.

Figure 3:
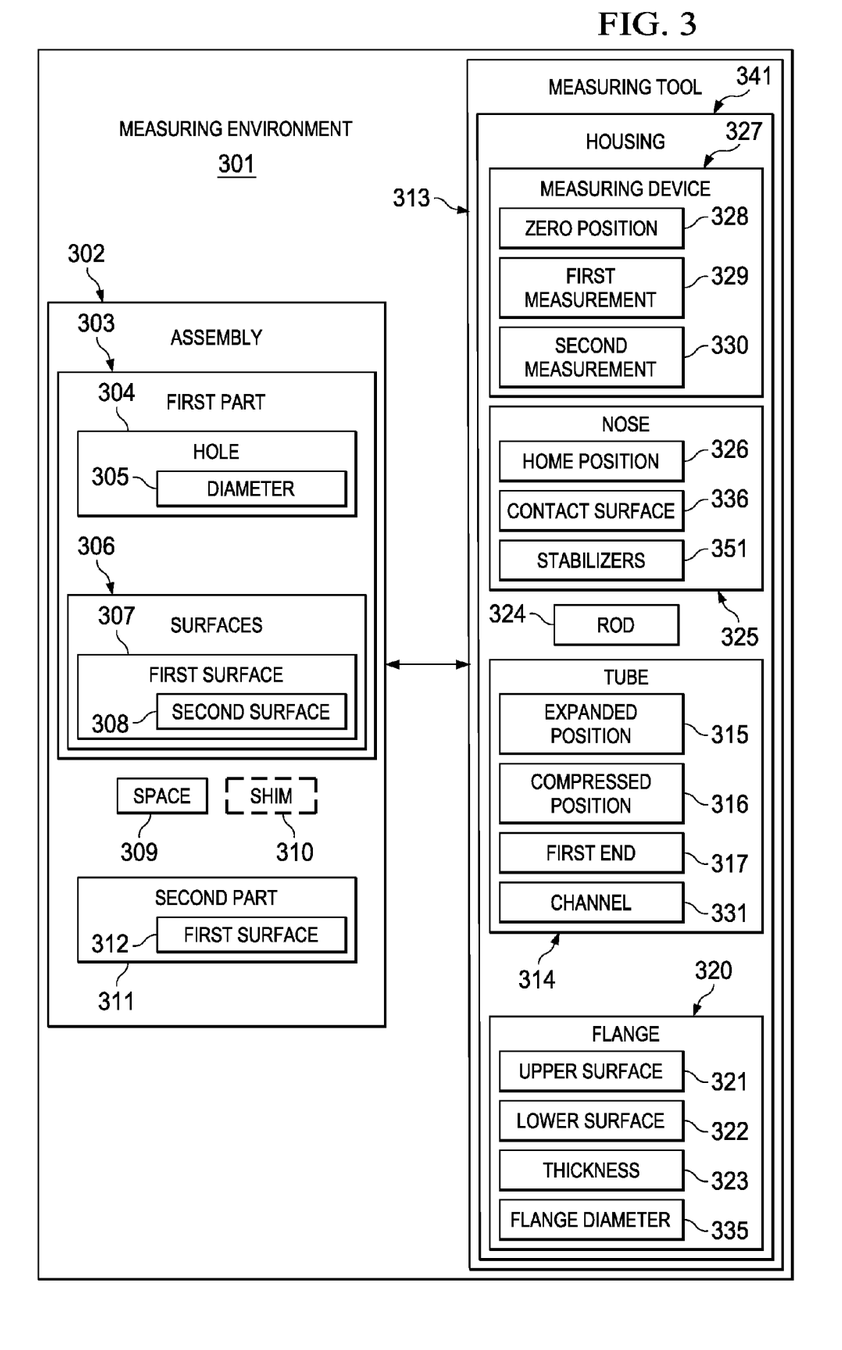
FIG. 3 is an illustration of a block diagram of a measurement environment in accordance with an advantageous embodiment.

With reference now to FIG. 3, an illustration of a block diagram illustrating a measuring environment is depicted in accordance with an advantageous embodiment. In this example, measurement environment 301 includes measuring tool 313 that may be used in conjunction with assembly 302. In an advantageous embodiment illustrated in FIG. 3, measuring tool 313 is implemented to measure space 309 existing between first part 303 and second part 311 in assembly 302.

Measuring tool 313 includes tube 314. Tube 314 may comprise a general elongate member. In an advantageous embodiment, tube 314 may be a hollow tube that includes first end 317. First end 317 of tube 314 may transition back and forth between expanded position 315 and compressed position 316. Flange 320 may be disposed proximate to first end 317 of tube 314. Flange 320 may include upper surface 321 and lower surface 322. Additionally, flange 320 may be characterized by thickness 323 and flange diameter 335.

Measuring tool 313 may also comprise rod 324. Tube 314, when defining a hollow tube, may define channel 331. Rod 324 may be disposed within channel 331 of tube 314 such that rod 324 may move within tube 314 with a generally linear movement. In other words, rod 324 may move along an axis extending centrally though tube 314. Rod 324 may thus move such that at least a portion of rod 324 is proximate to first end 317 of tube 314. In an advantageous embodiment, tube 314 may be configured to take compressed position 316 when rod 324 is not positioned within tube 314. Disposing rod 324 within tube 314 such that a portion of rod 324 is disposed proximate to first end 317 of tube 314 and may transition tube 314 to expanded position 315. Removing rod 324 from tube 314 allows tube 314 to return to compressed position 316.

In an advantageous embodiment, tube 314 is substantially circular in an outer shape. However, tube 314 may take other outer shapes, both curved and angled, such as, for example, hexagonal or octagonal. In one advantageous embodiment rod 324 may be substantially cylindrical in shape, although rod 324 may take other shapes. Channel 331 may be configured with a shape so as to receive rod 324 and to allow rod 324 to move within channel 331. Rod 324 may move in a substantially linear direction within tube 314. Channel 331 may extend from first end 317 of tube 314 to a further opening (not shown) which allows rod 324 to enter tube 314.

In an advantageous embodiment, measuring tool 313 may also include nose 325. Nose 325 may be disposed to generally surround first end 317 of tube 314. First end 317 of tube 314 may move in and out of nose 325. In home position 326, first end 317 of tube 314 is positioned within nose 325. Further, in home position 326, lower surface 322 of flange 320 is substantially parallel with contact surface 336 of nose 325. First end 317 of tube 314 may move out of nose 325 and away from home position 326. One or more stabilizers 351 may be positioned proximate to nose 325. Stabilizers 351 may be used in positioning of measuring tool 313.

Nose 325 may provide a function of protecting tube 314, first end 317, and flange 320. Additionally, nose 325 may provide a function of squaring or aligning measuring tool 313 with respect to first part 303 in order to perform measurements as described herein. Further, nose 325 may provide the function of contacting first part 303 so as to provide a start position for a series of measurements and movements of measuring tool 313.

Measuring tool 313 may also include measuring device 327. Measuring device 327 may comprise any appropriate measuring apparatus for taking measurements as further described herein. For example, measuring device 327 may comprise a measuring device that measures linear movement of tube 314. Measuring device 327 may comprise, by way of example only, a laser tool, a micrometer, or a dial gauge. Measuring device 327 may be configured to be zeroed and to take multiple measurements during usage of measuring tool 313. For example, when first end 317 of tube 314 is in home position 326, measuring device 327 may be in zero position 328. First measurement 329 and second measurement 330 may be taken when measuring tool 313 is put in a different configuration as discussed further herein.

In an advantageous embodiment, measuring tool 313 also includes housing 341, which may generally surround and protect components of measuring tool 313, including tube 314, flange 320, rod 324, and measuring device 327.

In one advantageous embodiment, measuring tool 313 may take the general form of a hand tool. For example, a hand tool may be a tool generally used manually by a worker. In another advantageous embodiment, measuring tool 313 may take the form of an automated tool, such as a tool connected to a robotic arm.

Measuring tool 313 may be any appropriate tool for performing a desired measuring operation on assembly 302. In one advantageous embodiment, assembly 302 may be an assembly of parts or structures, such as, for example, an assembly of an aircraft. In one advantageous embodiment, measuring tool 313 is used to measure space 309 that exists between first part 303 and second part 311 of assembly 302.

Assembly 302 may include first part 303 and second part 311. First part 303 has surfaces 306 that include first surface 307 and second surface 308. Second part 311 has first surface 312. Space 309 is located between first surface 307 of first part 303 and first surface 312 of second part 311. First part 303 may also have hole 304. Hole 304 has diameter 305. Shim 310 is shown with shadow lines in FIG. 3. Shim 310 represents that it may be desired to fit shim 310 into space 309 that exists between first part 303 and second part 311.

The illustration of measuring environment 301 in FIG. 3 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

In an advantageous embodiment, measuring tool 313 includes a substantially rectangular housing 341 that encloses other features of measuring tool 313. Housing 341 may enclose measuring device 327, nose 325, and flange 320. In another advantageous embodiment, assembly 302 comprises a first structure, which corresponds to first part 303, and a second structure, which corresponds to second part 311. An aircraft skin may be an example of first part 303 or first structure, and an aircraft spar may be an example of second part 311 or a second structure.

Figure 4:
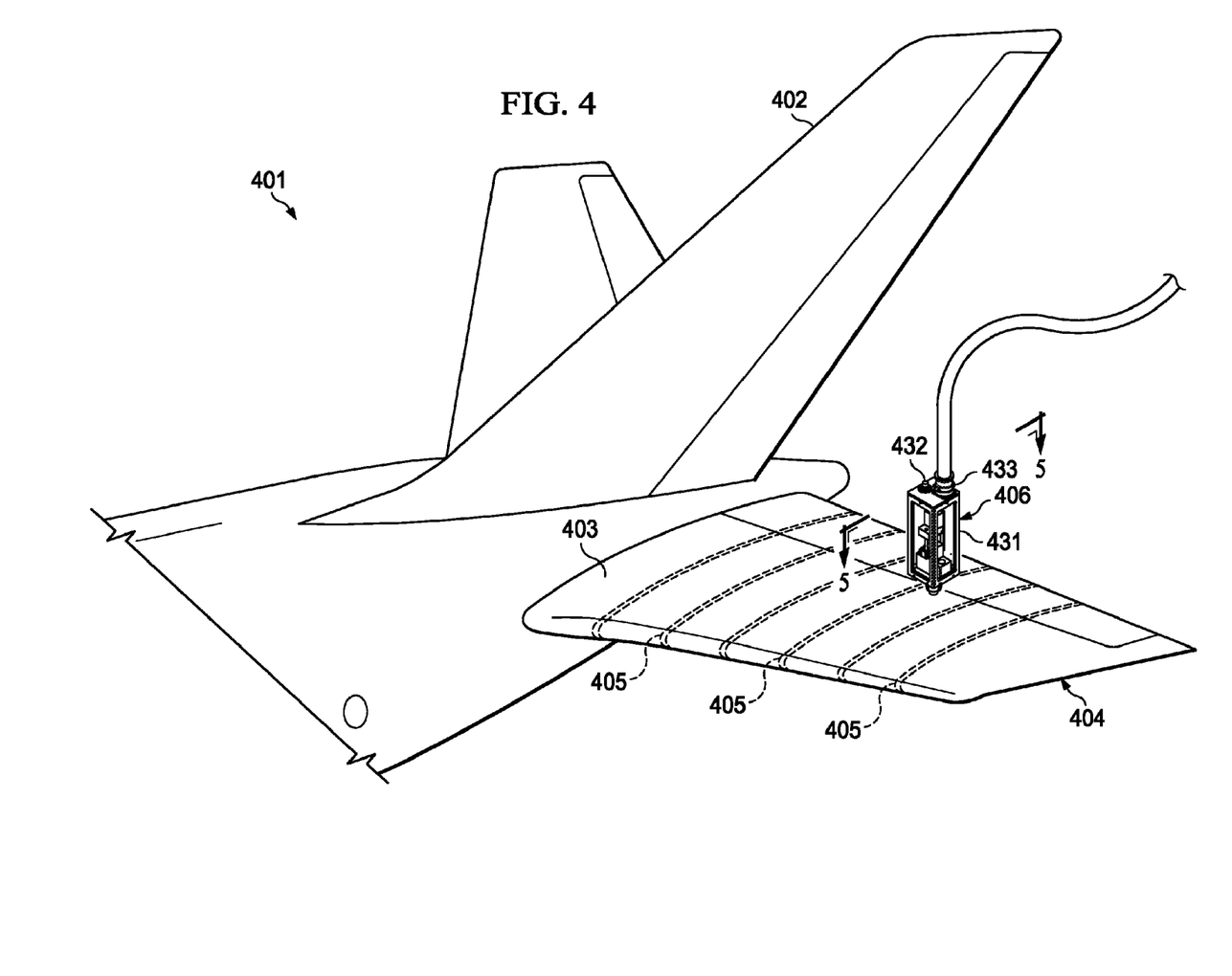
FIG. 4 is an illustration of a diagram of a tail assembly in accordance with an advantageous embodiment.

With reference now to FIG. 4, an illustration of a diagram of a measuring tool 406 is depicted in accordance with an advantageous embodiment. In this example, measuring tool 406 is an example of a physical implementation of measuring tool 313 shown in block form in FIG. 3.

In this illustrative example, measuring tool 406 is used in conjunction with tail assembly 402 of aircraft 401. Aircraft 401 is an example of one physical implementation of aircraft 200 in FIG. 2. Tail assembly 402 includes horizontal stabilizer 403. Horizontal stabilizer 403 includes skin 404 and spars 405. Spars 405 are shown in dashed lines to illustrate that spars 405 may be positioned below skin 404. Skin 404 and spars 405, in this example, illustrate one example of first part 303 and second part 311 in FIG. 3.

Figure 5:
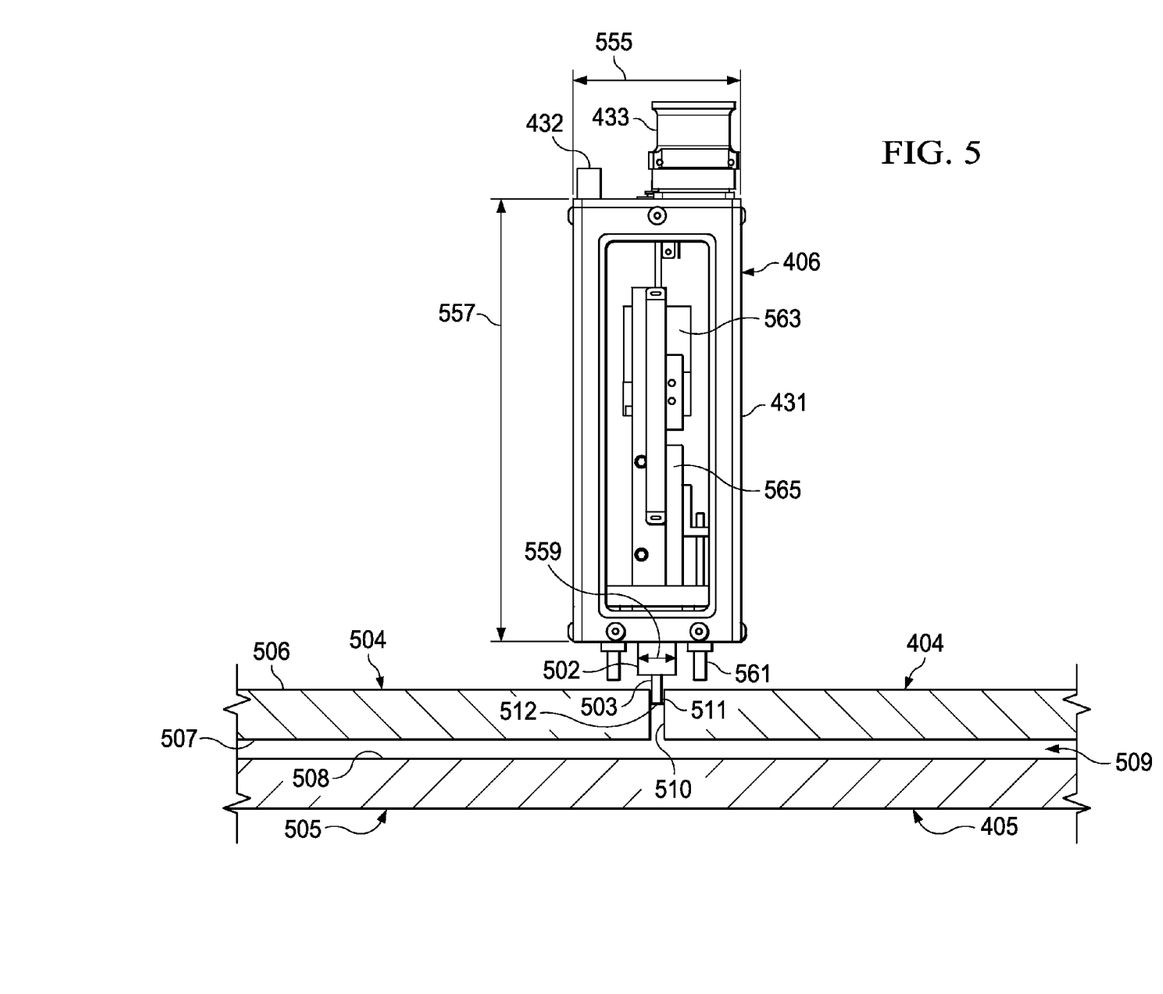
FIG. 5 is an illustration of a cross-sectional diagram of a measuring tool in accordance with an advantageous embodiment.

A manufacturing process may be used to affix skin 404 to spars 405. Measuring tool 406 may be used to make measurements. In this example, measuring tool 406 is disposed on skin 404 of horizontal stabilizer 403. Measuring tool 406 may be positioned such that a tube (not shown) passes through holes so as to measure the space between skin 404 and spars 405. In FIG. 4, lines 5-5 illustrate a cross-sectional take off as shown in FIG. 5 below.

FIG. 4 also illustrates some of the features of measuring tool 406 as shown in this example. Measuring tool 406 may include housing 431, which is generally configured to protect measuring tool 406. Housing 431 generally surrounds components of measuring tool 406.

Switch 432 may be positioned on housing 431. Switch 432 may be used in taking measuring operations as described herein, such as zeroing, taking a first measurement, and taking a second measurement.

Additionally, measuring tool 406 may include plug 433. Plug 433 may provide a connectivity to measuring tool 406 for other auxiliary applications, which are not illustrated. Plug 433 may thus receive electrical power, data or digital connectivity, and mechanical power lines. Mechanical power to measuring tool 406 may take various embodiments, such as, but not limited to, air pressure, hydraulic power, and electrical power.

Turning now to FIG. 5, an illustration of a diagram of a measuring tool as illustrated in FIG. 4 is depicted. FIG. 5 is an illustration of a cross-sectional diagram following the cross-sectional lines 5-5 of FIG. 4. In this view, measuring tool 406 includes nose 502, tube 503, and flange 512. Also, as shown in FIG. 4, measuring tool 406 includes housing 431, switch 432, and plug 433. Also shown in FIG. 5 are stabilizers 561, which may be used to further position measuring tool 406 on aircraft skin 404. Within housing 431 of measuring tool 406 are sensor 563 and air actuator 565. Sensor 563 comprises a measuring device as described herein. Air actuator 565 comprises an advantageous embodiment of how tube 503 may be moved through use of air pressure.

As depicted in FIG. 5, flange 512 is connected to first end 511 of tube 503. First end 511 of tube 503 is in a compressed position. In the compressed position, the diameter of flange 512 allows flange 512 to pass through hole 510 of aircraft skin 404. Preferably, in the compressed position, the diameter of flange 512 is less than or approximately equal to the diameter of hole 510. Aircraft skin 404 is positioned relative to spars 405 so as to define space 509 therebetween. Flange 512 has moved below first surface 506 of first part 504; however, flange 512 is above second surface 507 of first part 504. Flange 512 still remains above first surface 508 of second part 505.

Referring still to FIG. 5, the physical dimensions of measuring tool 406 may vary. In an advantageous embodiment, housing 431 comprises a substantially rectangular or boxlike shape. The dimensions of the base and top of housing 431 are substantially equivalent and substantially square. A typical width, w, is given reference number 555, and width, w, may vary between about 1.5 to about 3.0 inches. The length of housing 431, noted by reference 557 may vary between about six to about eight inches.

With respect to the measurements obtained by measuring tool 406, the precision of measurements may also vary. In the advantageous embodiment, where measuring tool 406 is used to measure a space between skin 404 and spar 405, measurements may be taken with a variation of less than about 0.005 inch. In the advantageous embodiment, a measuring sensor manufactured by Sony Corporation is used. The measuring sensor is a Magnescale® Series Linear Encoder denoted by part number SR118. The sensor makes measurements of linear movement using electric and/or magnetic detection.

A typical hole, such as hole 510 in FIG. 5, also has a dimension that may vary. For example, hole 510, which may be substantially cylindrical in cross section, may have a diameter and a length that may vary. Hole 510 is also depicted as having a generally vertical arrangement with respect to the orientation of FIG. 5; however, hole 510 may be oriented at a slant. In other words, a central axis (not shown) of hole 510 may be set at some angle other than 90 degrees relative to first surface 506 of aircraft skin 404. Hole 510 may be a hole that has been drilled to receive a fastener or other structure therethrough. In an advantageous embodiment, hole 510 is characterized by hole diameter 305 in FIG. 3 of between about 0.125 to about 0.5 inches. Tube 503 may include a diameter that allows tube 503 to pass through hole 510, and thus the diameter of tube 503 may vary as described with respect to hole 510. Nose 502 may take various outer shapes. In an advantageous embodiment, nose 502 is substantially cylindrical. Nose 502 may include diameter 559, shown by "d", that prevents nose 502 from passing into hole 510. In an advantageous embodiment, nose 502 includes diameter 559 of between about one to about three inches.

Figure 6:
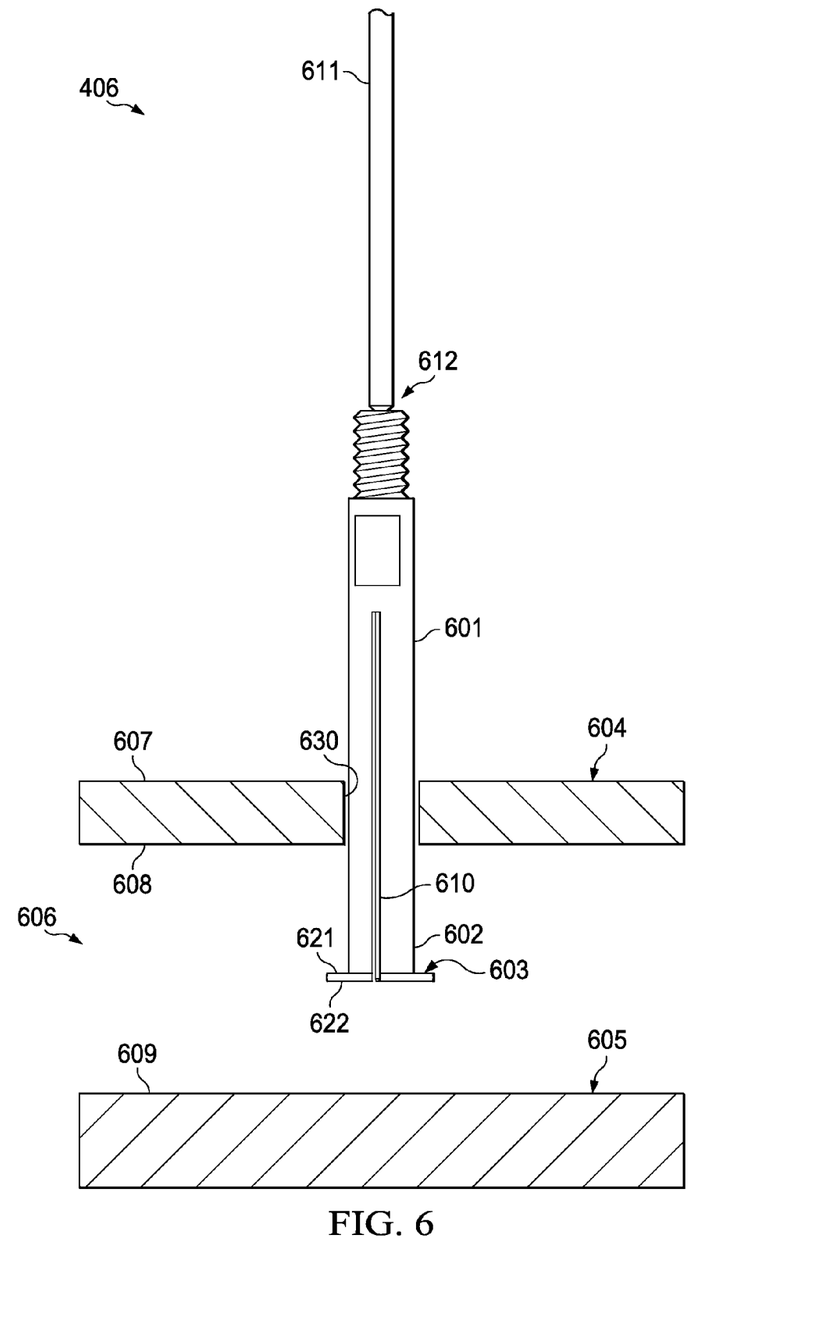
FIG. 6 is an illustration of a cross-sectional diagram of a measuring tool in accordance with an advantageous embodiment.
Figure 7:
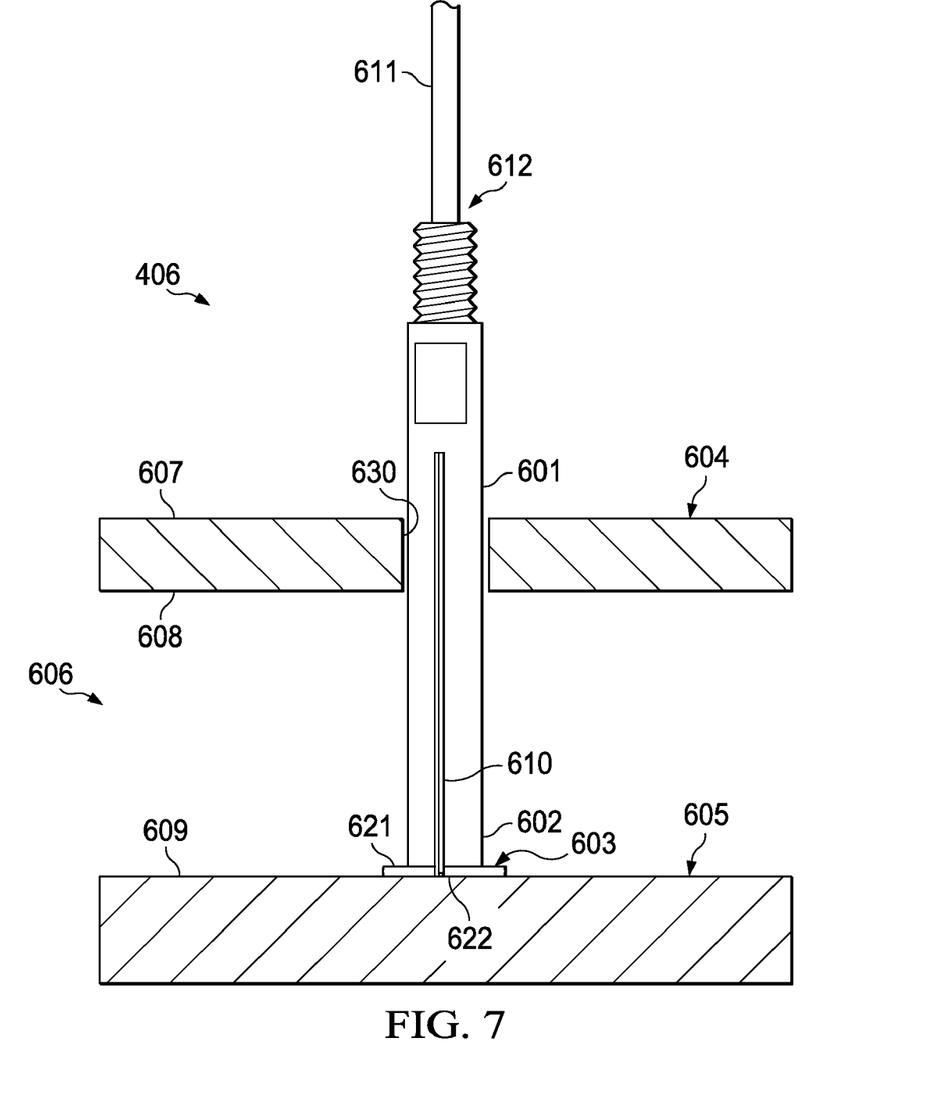
FIG. 7 is another illustration of a cross-sectional diagram of a measuring tool in accordance with an advantageous embodiment.
Figure 8:
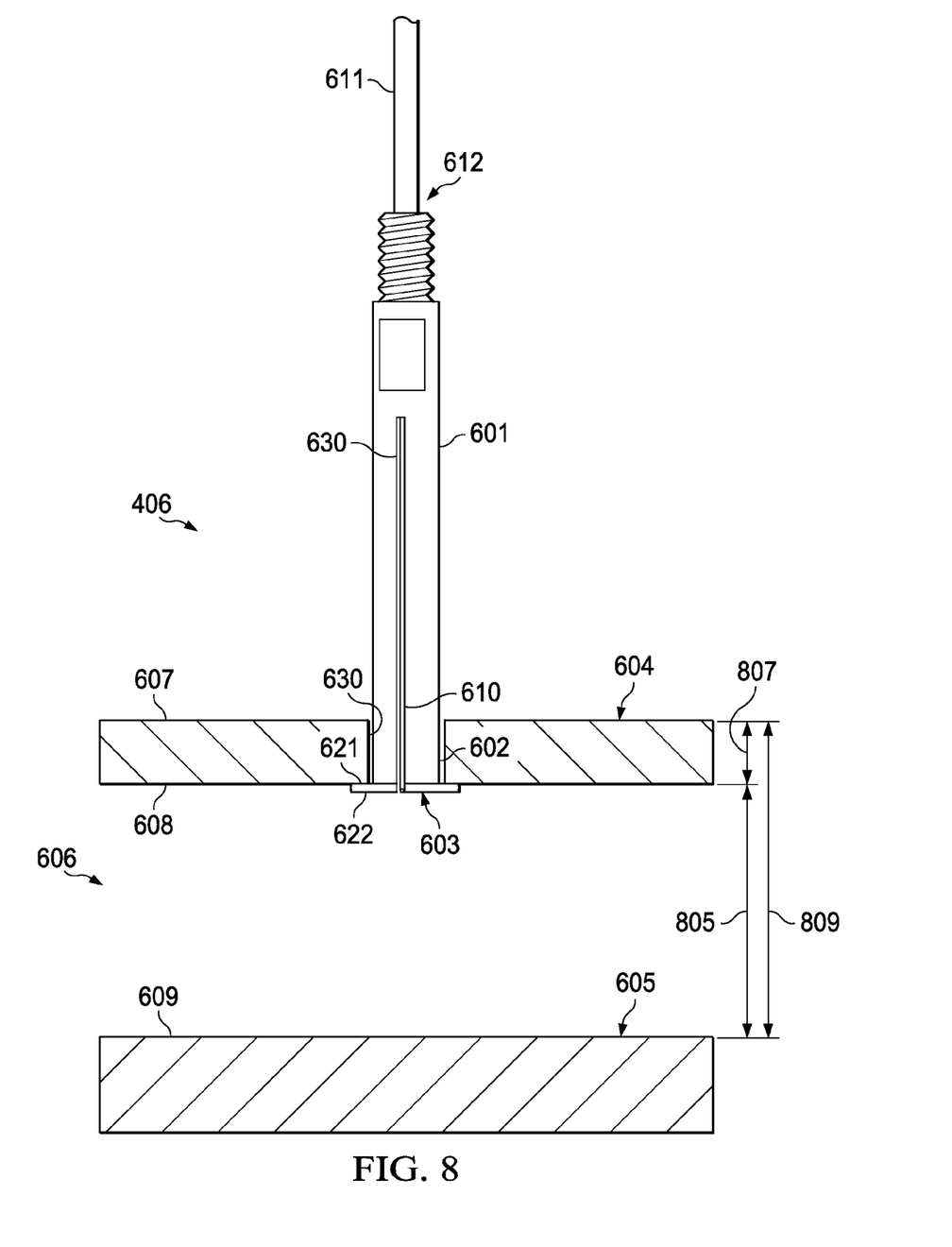
FIG. 8 is another illustration of a cross-sectional diagram of a measuring tool in accordance with an advantageous embodiment.

Turning now to FIGS. 6, 7, and 8, several illustrations of diagrams showing portions of measuring tool 406 are depicted in accordance with an advantageous embodiment. FIGS. 6, 7, and 8 illustrate portions of measuring tool 406 in different positions used to measure space 606.

With reference first to FIG. 6, some structures of measuring tool 406, such as housing 431, nose 502, sensor 563, and air actuator 565 are not shown to better illustrate the manner in which measurements are made. Only portions, or some portions, of measuring tool 406 are depicted to illustrate the manner in which measurements are made. FIGS. 6, 7, and 8 also depict structures, such as first part 604, second part 605, and space 606, which may correspond to aircraft skin 404 and spars 405.

As depicted, tube 601 in measuring tool 406 has been extended so as to pass through hole 630 and into space 606. First end 602 of tube 601 has passed through first surface 607 of first part 604. Rod 611 has been inserted into channel 612 of tube 601. Rod 611 has been inserted such that a portion of rod 611 is disposed proximate to first end 602 of tube 601. This positioning of rod 611 causes first end 602 of tube 601 to transition from the compressed position to the expanded position.

Slots 610 have allowed first end 602 to move to the expanded position. In the expanded position, the diameter of flange 603 is now greater than the diameter of hole 630. In the expanded position, flange 603 cannot pass through hole 630. In FIG. 6, it is also noted that flange 603 has not yet contacted any surfaces of first part 604 or second part 605. As depicted in FIG. 6, first end 602 of tube 601 is positioned between first part 604 and second part 605. Space 606 is between second surface 608 of first part 604 and first surface 609 of second part 605. In the position shown in FIG. 6, upper surface 621 and lower surface 622 of flange 603 are not in contact with first part 604 or second part 605.

Turning now to FIG. 7, an illustration of a diagram showing a measuring tool in another position is depicted in accordance with an advantageous embodiment. In this illustrative example, tube 601 of measuring tool 406 has been further extended relative to FIG. 6. Tube 601 has moved further below first surface 607 of first part 604 and second surface 608 of first part 604. Movement of tube 601 includes movement through hole 630. Rod 611 (not shown) remains in channel 612. Flange 603 of first end 602 has now contacted second part 605. More particularly, lower surface 622 of flange 603 is in contact with first surface 609 of second part 605. Upper surface 621 of flange 603 is not in contact with a surface. In moving to the position in FIG. 7, tube 601 has not transitioned out of the expanded position, and thus, slots 610 do not move relative to their position in FIG. 6. At this point, a first measurement is taken, such as first measurement 329 of FIG. 3.

Turning now to FIG. 8, an illustration of a diagram of a measuring tool in another position is depicted in accordance with an advantageous embodiment. As depicted, measuring tool 406 has been repositioned relative to FIG. 7. Tube 601 has been moved away from second part 605 and is now in contact with first part 604. More particularly, upper surface 621 of flange 603 is in contact with second surface 608 of first part 604. Lower surface 622 of flange 603 is not in contact with any surface. Flange 603 is above first surface 609 of second part 605. In moving to the position in FIG. 8 from FIG. 7, flange 603 has further moved through space 606 in a direction toward first part 604. Movement of tube 601 includes a movement through hole 630. In this position, a measurement may be taken, such as second measurement 330 of FIG. 3. It is noted in FIG. 8 that flange 603 makes contact with first part 604, because flange 603, being in the expanded position, is not free to pass through hole 630. Thus, as tube 601 was drawn up from its position in FIG. 7 to its position in FIG. 8, flange 603 makes contact with first part 604 and restricts further movement of tube 601 in the upwardly vertical direction (relative to the orientation of FIG. 8).

When tube 601 is to be extracted from the position FIG. 8, tube 601 can be transitioned to the compressed position. This may be achieved by withdrawing rod 611 from tube 601. Withdrawing rod 611 allows tube 601 to convert or transition to its natural or rest state, the compressed position. Slots 610 cooperate in allowing the transition. In the compressed position, the diameter of flange 603 is such that it allows flange 603 and tube 601 to be moved past first part 604.

In the above description of FIGS. 5-8, the first end of tube 601 has been described as being in the compressed position when at rest or in its natural condition. Tube 601 is transitioned to the expanded position by insertion of rod 611 into tube 601, and then tube 601 transitions to the compressed position when rod 611 is removed from tube 601. It is noted that other configurations are possible. For example, tube 601 may be configured so as to be in an expanded position when at rest. In this example, tube 601 may be converted to the compressed position by placing a compressor (not shown), such as a sliding sleeve, over an external position of first end 602 of tube 601. The compressor may be configured with a diameter such that the compressor squeezes first end 602 of tube 601, thereby allowing first end 602 to move.

Referring still to FIG. 8, measurements taken in accordance with an advantageous embodiment are shown as first measurement 805 and second measurement 807. First measurement 805, taken when flange 603 is in the position shown in FIG. 7, represents the distance between first surface 607 of first part 604 and first surface 609 of second part 605. First measurement 805 may be taken by sensor 563 of FIG. 5 as a measurement of linear travel of tube 601 from first surface 607 to first surface 609. Second measurement 807, taken when flange 603 is in the position shown in FIG. 8, represents the distance between first surface 609 of second part 605 and second surface 608 of first part 604. Second measurement 807 may be taken by sensor 563 of FIG. 5 as a measurement of linear travel of tube 601 from first surface 609 to second surface 608. The precision of first measurement 805 and second measurement 807 may be enhanced by zeroing tube 601 when flange 603 is in home position 326 as in FIG. 3 and nose 325 is in zero position 328 as in FIG. 3. The step of zeroing measuring tool 406 is further described herein with respect to a measuring method described in FIG. 10 below.

Space 809, which represents the distance between first surface 609 and second surface 608, may be determined by subtracting second measurement 807 from first measurement 805 while also allowing for thickness 323 as in FIG. 3 of flange 603. Determining space 809 may take into account thickness 323, because second measurement 807 is affected by the travel of tube 601 as limited by flange 603. In FIG. 8, upper surface 621 of flange 603 contacts second surface 608, whereas in FIG. 7, lower surface 622 of flange 603 contacts first surface 609. Thickness 323 as in FIG. 3 of flange 603 may be a known quantity.

The illustrations in FIGS. 5-8 are illustrations of an advantageous embodiment and are not meant to limit the manner in which the measuring tool can be implemented or the manner in which measurements can be taken. The order of movement in measuring tool 406, as shown in FIGS. 6, 7, and 8, is an illustration of one advantageous embodiment. The measurements of FIG. 8 are efficiently taken as they track the movement of measuring tool 406, and are, therefore examples of how measurements may be efficiently taken.

For example, when measuring multiple holes in an aircraft horizontal stabilizer, the measuring tool will transition from hole to hole and will move into and out of the different holes. However, in another example, a measurement may also be taken in which the measurement comprises the movement of tube 601 from first surface 609 of second part 605 to second surface 608 of first part 604. In another embodiment, a measurement may be taken of the travel of tube 601 from second surface 608 of first part 604 to first surface 609 of second part 605. Other kinds of measurements may also be taken.

In the description of an advantageous embodiment of FIGS. 6, 7, and 8, it is also noted that the transitioning movement of first end 602 of tube 601 is facilitated by the positioning of slots 610 in first end 602 of tube 601. Tube 601 may be formed with a plurality of slots 610. In an advantageous embodiment, slots 610 comprise cutaway portions of tube 601 that extend in a generally vertical direction. The number, size, and positioning of slots 610 may be selected so as to allow for easy transitioning movement of first end 602 of tube 601 from the compressed position to the expanded position and back to the compressed position.

Tube 601 and measuring tool 406 may generally be constructed of any materials that allow the functions described herein. Generally, metals and metallic alloys provide acceptable materials for the structure of measuring tool 406 as described. Aluminum alloys are an example of a material from which measuring tool 406 and tube 601 may be constructed. Other examples of metals that may be used include steel alloys, nickel-steel alloys, titanium, and titanium alloys. Other materials, such as plastics, ceramics, and composites, may also be used.

Figure 9:
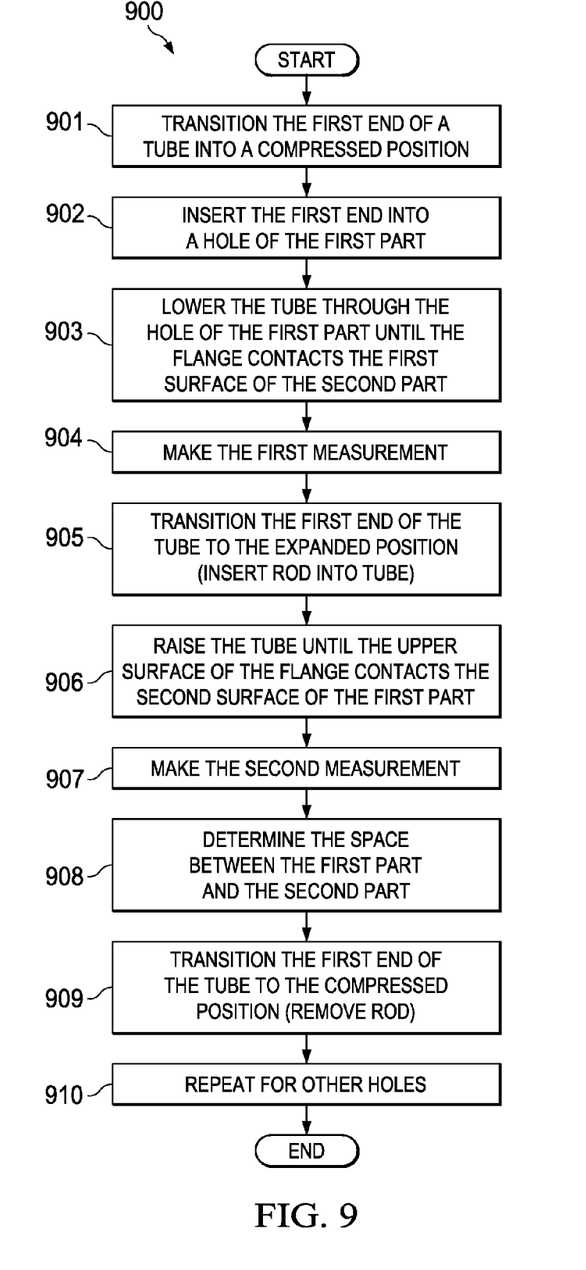
FIG. 9 is an illustration of a flowchart of a process for measuring a space between a first part and a second part in accordance with an advantageous embodiment.

With reference now to FIG. 9, an illustration of a flowchart of a process for measuring is depicted in accordance with an advantageous embodiment. The process is generally designated by reference number 900 and may be a process for measuring a space between a first part and a second part. One example of the process may be measuring the space between a skin and a spar in a horizontal stabilizer of a tail assembly as depicted in FIG. 4. The method may be implemented, for example, using measuring tool 313 interacting with assembly 302 of FIG. 3, and the following reference numbers will track the structures and features of those figures.

Process 900 may begin by transitioning first end 317 of tube 314 into compressed position 316 (operation 901). In an advantageous embodiment, first end 317 of tube 314 may naturally be in compressed position 316. In other embodiments, steps may need to be taken to transition first end 317 to compressed position 316. In one example, a compressor or sleeve slides proximate to first end 317 in order to transition first end 317 to compressed position 316.

In a further step, first end 317 of tube 314 is inserted into hole 304 of first part 303 of assembly 302 (operation 902). Flange 320 connected to first end 317 of tube 314 is sized in compressed position 316 so as to pass through hole 304. In an advantageous embodiment, hole 304 is a fastener hole that either exists or is formed in the first part. As one example, first part 303 may comprise an aircraft skin, and hole 304 comprises a fastener hole formed in the skin.

In a further step, tube 314 is lowered or moved through hole 304 of first part 303 until a lower surface of flange 320 contacts first surface 312 of second part 311 (operation 903). In an advantageous embodiment, second part 311 may comprise spars 405 to which aircraft skin 404 is to be attached. First measurement 329 may now be taken (operation 904).

In a further step, first end 317 of tube 314 is transitioned to expanded position 315 from compressed position 316 (operation 905). The transition from compressed position 316 to expanded position 315 may occur by inserting rod 324 into channel 331 of tube 314. Movement of rod 324 to a position proximate to first end 317 of tube 314 transitions first end 317 of tube 314 to expanded position 315.

In a further step, first end 317 of tube 314 is raised or moved until upper surface 321 of flange 320 contacts second surface 308 of first part 303 (operation 906). In expanded position 315, flange 320 has flange diameter 335 that is greater than hole 304, so flange 320 is prevented from passing through hole 304. Second measurement 330 may now be taken (operation 907).

In a further step, space 309 between first part 303 and second part 311 is determined (operation 908). Space 309 comprises the distance between first surface 312 of second part 311 and second surface 308 of first part 303. In an advantageous embodiment, the determination of space 309 is the difference of second measurement 330 from first measurement 329 with an allowance for thickness 323 of flange 320.

Measurements, such as in first measurement (operation 904) and second measurement (operation 907), may be taken using known measuring devices. Known measuring devices include laser devices, linear movement devices, dial gauges, and micrometers. A measurement may include, for example, both a notation of position, as well as a measure of movement of the tube.

In a further step, first end 317 of tube 314 is transitioned to compressed position 316 (operation 909). In an advantageous embodiment, operation 909 may be achieved by removing rod 324 from channel 331 of tube 314. This allows first end 317 of tube 314 to return to its relaxed or natural condition, which is compressed position 316. In compressed position 316, flange 320 will have flange diameter 335 less than diameter 305 of hole 304, and tube 314 can be withdrawn through hole 304.

In a further step, the above series of operations may be repeated for other hole locations (operation 910). In the advantageous embodiment where measurements are taken of the space between skin 404 and spars 405, the series of operations may be repeated for multiple holes in skin 404.

In this manner, a mapping of the space between the skin and an underlying spar or series of spars may be taken. The mapping will represent the spacing measured at each of the multiple hole locations. The spacing information may also be transferred to a controller, memory, or other computer-assisted device so as to record and process the spacing information as further described herein with respect to FIG. 13. The spacing information may then be used to design and fashion shim 310 that would fit within space 309.

Figure 10:
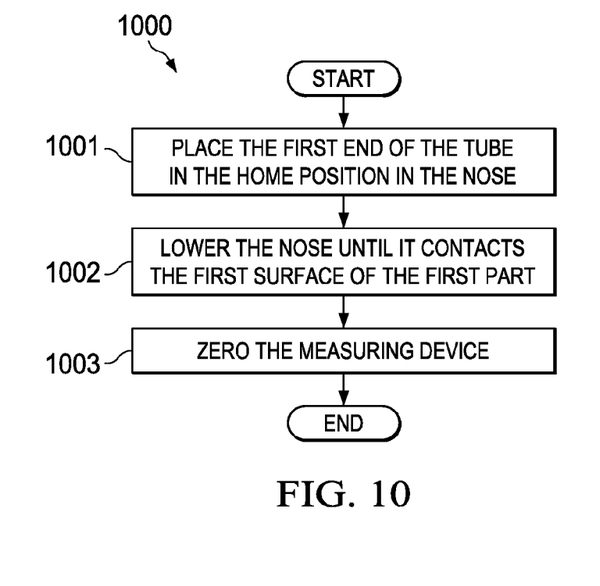
FIG. 10 is an illustration of a flowchart of a process for zeroing a measuring device in accordance with an advantageous embodiment.

Referring now to FIG. 10, an illustration of a flowchart of a process for zeroing a measuring device is depicted. The method of FIG. 10 may again be performed with measuring tool 313 and assembly 302 of FIG. 3 and is described with respect to features therein. The process is generally indicated by reference number 1000. The steps in FIG. 10 may be performed in conjunction with the steps shown in FIG. 9. In one operation, first end 317 of tube 314 is placed in home position 326 in nose 325 (operation 1001).

Next, nose 325 is lowered until contact surface 336 of nose 325 contacts first surface 307 of first part 303 (operation 1002). Afterwards, measuring device 327 is zeroed to zero position 328 (operation 1003), with the process terminating thereafter. In an advantageous embodiment of the steps of FIG. 10, nose 325 of measuring tool 313 is placed in contact with the upper surface of an aircraft skin. Here, lower surface 322 of flange 320 is substantially aligned with contact surface 336 of nose 325 in home position 326. The measuring device is zeroed at that position.

Figure 11:
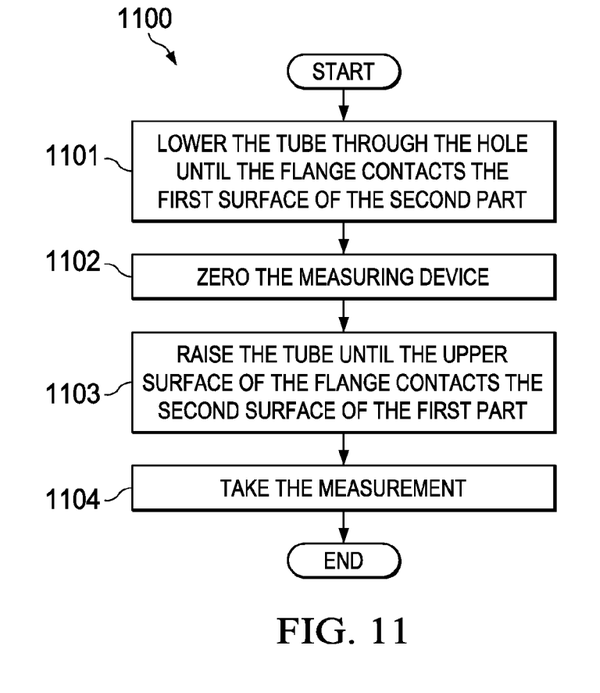
FIG. 11 is an illustration of a flowchart of a process for measuring a space between a first part and a second part in accordance with an advantageous embodiment.

With reference now to FIG. 11, an illustration of a flowchart of a process for measuring the space between parts is depicted. The process is generally indicated by reference number 1100. Again, the steps are described with respect to elements in FIG. 3. First, tube 314 is lowered through hole 304 until lower surface 322 of flange 320 contacts first surface 312 of second part 311 (operation 1101). At this position, measuring device 327 is zeroed (operation 1102). Next, tube 314 is raised until upper surface 321 of flange 320 contacts second surface 308 of first part 303 (operation 1103). The measurement is taken when tube 314 is at the position of step 1103 with upper surface 321 of flange 320 in contact with second surface 308 of first part 303 (operation 1104), with the process terminating thereafter.

Figure 12:
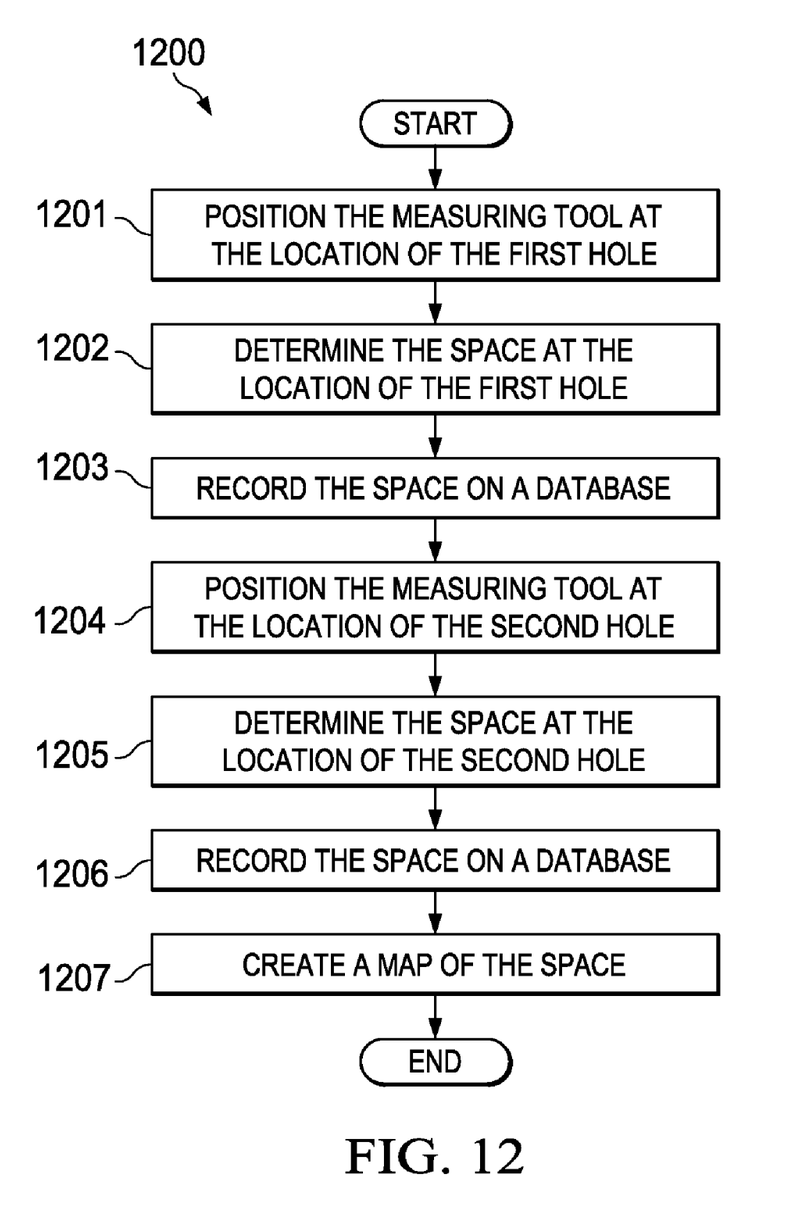
FIG. 12 is an illustration of a flowchart of a process for creating a map of spacing in accordance with an advantageous embodiment.

With reference now to FIG. 12, an illustration of a flowchart of a process for creating a map of a space between parts is depicted. The flowchart is again described with reference to elements as described in FIG. 3. The process is generally indicated by reference number 1200. In one step of the process, measuring tool 313 is positioned at the location of a first hole (operation 1201). A space at the first hole location is determined (operation 1202). The space represents the space between first part 303 and second part 311, such as the spacing between an aircraft skin and a spar in an aircraft assembly. The space is recorded on a database (operation 1203). In a further step, measuring tool 313 is positioned at a second hole location (operation 1204). The space is determined at the location of the second hole (operation 1205). The space may be recorded on a database (operation 1206). In a further step, a map of the spacing is created (operation 1207), with the process terminating thereafter. It will be appreciated that a map of spacing may thus be created for a number of holes.

The flowcharts and block diagrams in the different depicted embodiments illustrate the architecture, functionality, and operation of some possible implementations of apparatus, methods, and computer program products. In this regard, each block in the flowcharts or block diagrams may represent a module, segment, an operation, or a portion of computer usable or readable program code, which comprises one or more executable instructions for implementing the specified function or functions. Some of the blocks may be performed by human operators, machines, or other types of operators.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

In an advantageous embodiment of the disclosure described herein, a measuring tool is provided that may be positioned so that an operator may take a measurement of the space between a first part and a second part wherein the space has a restricted or limited access. A measuring tool may include, for example, a tube, a nose, a flange, a rod, and/or a measuring device. The tube, nose, rod, and/or measuring device may be positioned in a housing. The tube includes a first end, and the first end of the tube is configured to transition between a compressed position and an expanded position. The tube may also include at least one cutaway portion proximate to the first end. The cutaway portion may comprise a number of slots formed lengthwise along the tube. The flange may be disposed proximate the first end. The flange may have an upper surface and a lower surface, and the flange may be characterized by a thickness. The flange and the first end may be configured to pass through a hole of a first part when the first end is in the compressed position. Further, the flange may be configured such that the upper surface of the flange contacts a lower surface of the first part when the first end is in the expanded position. The rod may be disposed so as to move in the tube. In order to receive the rod, the tube may be hollow and characterized by a channel. The rod may be configured to transition the tube to the expanded position when the rod is inserted in the tube proximate to the first end. The measuring device may be configured to record movement of the tube.

In an advantageous embodiment of the disclosure described herein, an operator may quickly and efficiently take precision measurements of a space between structures. In the assembly of aircraft, the embodiments described herein allow an operator to position a measuring tool in a space where conventional measuring devices could not make access. The slim configuration of the measuring tool and the linear movement of the tube of the measuring tool allow the tube to enter into and out of small apertures, such as fastener holes. The measuring tool can be positioned where conventional measuring systems could not be placed. The flange of the measuring tool may further be transitioned from a compressed position to an expanded position so as to allow the flange and tube to be positioned for taking measurements. Further, the automated movement of the measuring tool, such as by air actuation, allows quick and rapid measurements.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   an elongate member, wherein an end of the elongate member is configured to move through a hole in a first structure into a space located between the first structure and a second structure;
   a flange extending from the elongate member, wherein the elongate member is configured to expand after the flange exits the hole in the first structure such that the flange is unable to pass back through the hole; and
   a measurement system configured to measure movement of the end of the elongate member to identify a length of the space between the first structure and the second structure.

2. The apparatus of claim 1, wherein the elongate member has a channel extending from a first end of the elongate member and further comprising:
   a rod configured to move inside the channel, wherein the elongate member is configured to expand when the rod is moved from a first position to a second position after the flange exits the hole in the first structure.

3. The apparatus of claim 2, wherein the elongate member has a substantially cylindrical shape and further comprising:
   a number of slots extending a distance from the end of the elongate member.

4. The apparatus of claim 1, wherein the measurement system is configured to measure a first distance from an outer surface of the first structure to an inner surface of the second structure and a second distance from the outer surface of the first structure and the inner surface of the first structure, wherein the distance of the space is a difference between the first distance and the second distance.

5. An apparatus for measuring a space comprising:
   a tube having a first end, wherein the first end of the tube is configured to transition between a compressed position and an expanded position, the tube having at least one cutaway portion proximate to the first end;
   a flange disposed proximate to the first end, the flange having an upper surface and a lower surface, and the flange characterized by a thickness; the flange and the first end are configured to pass through a hole of a first part when the first end is in the compressed position and the flange is configured such that the upper surface of the flange contacts a lower surface of the first part when the first end is in the expanded position;
   a rod moveably disposed in the tube, wherein the rod is configured to transition the tube to the expanded position when the rod is inserted in the tube proximate to the first end; and
   a measuring device configured to record movement of the tube.

6. The apparatus of claim 5 further comprising a nose disposed around the first end of the tube.

7. The apparatus of claim 5, wherein the cutaway portion comprises a plurality of slots formed lengthwise along the tube.

8. The apparatus of claim 5, wherein the measuring device comprises one of a dial gauge, a laser, and a micrometer.

9. The apparatus of claim 5, wherein the first end of the tube is in the compressed position when at rest.

10. The apparatus of claim 9, wherein the first end of the tube is configured to move to the compressed position when the rod is removed from the tube.

11. The apparatus of claim 5, wherein the first end of the tube is in the expanded position when at rest.

12. The apparatus of claim 11 further comprising a compressor configured to move linearly along an outer surface of the tube such that moving the compressor proximate to the first end of the tube and over the cutaway portion transitions the first end of the tube into the compressed position.

13. The apparatus of claim 5 further comprising a housing, wherein the housing surrounds the tube.

14. A method for measuring a space between a first part and a second part comprising the steps of:
   inserting a first end of a tube into a hole of the first part until a lower surface of a flange disposed on the tube contacts a first surface of the second part; making a measurement of distance between a first surface of the first part and the first surface of the second part as a first measurement;
   raising the tube until an upper surface of the flange disposed on the tube contacts a second surface of the first part;
   making the measurement of distance between the first surface of the first part and the second surface of the first part as a second measurement; and
   determining the space between the second surface of the first part and the first surface of the second part.

15. The method of claim 14 further comprising the step of zeroing a measuring device when a nose disposed around the first end of the tube is placed in contact with the first surface of the first part.

16. The method of claim 14 further comprising the step of expanding the first end of the tube to an expanded position when the first end of the tube is positioned within the space between the first part and the second part.

17. The method of claim 16, wherein the step of expanding the first end of the tube further comprises inserting a rod in the tube so as to expand the first end of the tube.

18. The method of claim 14, wherein the step of determining the space comprises subtracting the second measurement from the first measurement and allowing for a thickness of the flange.

19. The method of claim 14, wherein the steps of making the measurement of distance between the first surface of the first part and the first surface of the second part as the first measurement and the step of making a measurement of distance between the first surface of the first part and the second surface of the first part as the second measurement are performed in reverse order.

20. A method for measuring a space between a first part and a second part comprising the steps of:
   inserting a first end of a tube into a hole of the first part until the first end of the tube contacts a first surface of the second part;
   zeroing a measuring device when the first end of the tube contacts the first surface of the second part;
   placing an upper surface of a flange disposed on the first end of the tube against a second surface of the first part; and
   making a measurement of distance between the first surface of the second part and the second surface of the first part.

* * * * *